Aug. 11, 1964    F. KULCSAR ETAL    3,144,411
BARIUM-CONTAINING LEAD TITANATE FERROELECTRIC
COMPOSITIONS AND ARTICLES
Filed Nov. 13, 1961

INVENTOR.
BERNARD JAFFE
FRANK KULCSAR
BY
ATTORNEY

United States Patent Office 3,144,411
Patented Aug. 11, 1964

3,144,411
BARIUM-CONTAINING LEAD TITANATE FERRO-
ELECTRIC COMPOSITIONS AND ARTICLES
Frank Kulcsar, Fairview Park, and Bernard Jaffe, South
Euclid, Ohio, assignors to Clevite Corporation, a corporation of Ohio
Filed Nov. 13, 1961, Ser. No. 151,847
16 Claims. (Cl. 252—62.9)

This invention relates broadly to compositions of matter and articles of manufacture fabricated therefrom. More particularly, the invention pertains to novel ferroelectric ceramics which are polycrystalline aggregates of certain constituency, as hereinafter described, fired to ceramic maturity and thereafter polarized or capable of being polarized to impart thereto electromechanical transducing properties similar to the well-known piezoelectric effect. The invention also encompasses the unreacted physical mixtures of raw ingredients which are the precursors of such ceramic materials, the reacted product of such mixtures and the articles of manufacture such as electromechanical transducers fabricated from the matured ceramic. It will be understood that the term "ceramic compositions" as used hereinafter is intended to encompass unreacted physical mixtures as well as reacted mixtures and the matured ceramic which is the ultimate product. "Ceramic materials" will be used to refer specifically to the fired or matured ceramic.

The ceramic compositions contemplated by the invention have as their principal constituent compositions selected from the binary systems (1) lead titanate-lead zirconate and (2) lead titanate-lead stannate and the ternary system lead titanate-lead zirconate-lead stannate.

Because of their potentially lower cost and their greater durability under adverse atmospheric conditions, ferroelectric ceramic materials have come into prominence in recent years as substitutes for crystals in various transducer applications in the production, measurement and/or sensing of sound, shock vibration, pressures, etc. Among the more promising ceramics for this purpose is lead zirconate titanate, a polycrystalline material composed of $PbZrO_3$ and $PbTiO_3$ effectively in solid solution. In certain ranges of composition on the basis of mol percentages of its constituents, lead zirconate titanate exhibits highly desirable electrical and mechanical properties, particularly, when electrostatically polarized, a high electromechanical coupling. These ranges and examples of preferred compositions and their properties are disclosed with particularity in U.S. Letters Patent Number 2,708,244, issued on May 10, 1955, to Bernard Jaffe.

Similar to lead zirconate titanate in structure and properties are materials from the ternary system

$$PbZrO_3—PbTiO_3—PbSnO_3$$

Within certain ranges hereinafter set forth, members of these systems also display marked ferroelectric properties rendering them useful in the same general fields of application as the lead zirconate titanate ceramics. A large number of such compositions from the lead titanate-lead zirconate-lead stannate system are disclosed in National Bureau of Standards Report No. 3684 (Jaffe, Roth & Marzullo, Report No. 9, October 1, 1954), entitled "Improvements in Piezoelectric Ceramics," and summarized more fully in Research Paper 2626 by the same authors, entitled "Properties of Piezoelectric Ceramics in the Solid-Solution Series Lead Titanate-lead Zirconate-Lead Oxide: Tin Oxide and Lead Titanate-Lead Hafnate," published in the Journal of Research of the National Bureau of Standards, vol. 55, No. 5, November 1955, pp. 239–254.

Prepolarized ceramics for piezoelectric and electrostrictive applications are a comparatively recent development and while intensive research by workers in the field has succeeded in producing materials acceptable for some commercial purposes, before the full potentialities of these materials can be realized, many problems, some or all of which pertain in varying degrees to all known ferroelectric ceramics, must be overcome.

An important problem in the field of ceramic transducers is the fact that all or most of the important properties required for a given application do not coincide in any single known material and improvements in one property usually are achieved, if at all, at the expense of another. For example, some ferroelectric ceramics are characterized by a higher electromechanical sensitivity than others but have a lower dielectric constant. Chemical modification to effect improvement of the dielectric properties frequently results in an unwanted decrease in electromechanical response. Thus in uses where maximum values for both of these properties are desirable, a compromise is necessary. Another frequently encountered difficulty in attempting the modification of ceramics, is the lowering of the Curie temperature, which if exceeded in use, results in complete or partial depolarization of the elements.

It is, therefore, the fundamental object of the present invention to provide novel and improved piezoelectric ceramic materials which overcome at least one of the problems outlined above.

A more specific object of the invention is to provide improved polycrystalline ceramics characterized by relatively high Curie temperatures, relative permittivity and piezoelectric response.

Another object is the provision of ceramic materials combining high piezoelectric effect with a high dielectric constant.

A still further object of the invention is the provision of improved electromechanical transducers utilizing, as the active elements, an electrostatically polarized body of the novel ceramic compositions alluded to above and hereinafter described and claimed.

These and further objects of the invention are accomplished by the improved ceramic compositions contemplated by the present invention which comprise at least 95% by weight, in oxidic form, of lead, titanium and zirconium and/or tin in stoichiometric proportions corresponding to lead titanate and lead zirconate and/or lead stannate, 1 to 25 atom percent of the lead being substituted for by barium. Strontium or calcium may be used in place of part of the barium. The balance of the ceramic compositions further may comprise, also in oxidic form, from zero to 5.0 weight percent of at least one member of the group consisting of tantalum, niobium, and the rare earth elements including yttrium but excluding cerium.

Inasmuch as there is some uncertainty and conflict of opinion on the stability and separate existence of lead stannate, it is to be understood that in this description, lead stannate may be considered as lead oxide (PbO) and tin oxide ($SnO_2$) in the stoichiometric proportions (a mol ratio 1:1) corresponding to the empirical formula $PbSnO_3$. It is further pointed out that the weight percentages of ingredients hereinafter stated are calculated on the basis of their respective oxides.

Additional objects of the invention, its advantages, scope and the manner in which it is practiced will be readily apparent to those conversant with the art from a reading of the following description and subjoined claims in conjunction with the annexed drawing, in which, FIGURE 1 is a perspective elevational view of an electromechanical transducer embodying the present invention;

Figure 1:
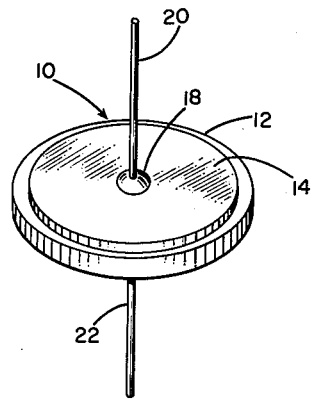
Figure 2:
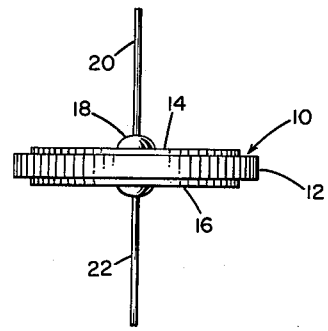
FIGURE 2 is a side elevational view of the transducer shown in FIGURE 1.

Before proceeding with a detailed description of the ferroelectric ceramic materials contemplated by the invention, their application in electromechanical transducers will be described with reference to FIGURES 1 and 2 of the drawings wherein reference character 10 designates, as a whole, an electromechanical transducer having, as its active element, a preferably disk-shaped body 12 of a piezoelectric ceramic material according to the present invention.

Body 12 is electrostatically polarized, in a manner hereinafter set forth, and is provided with a pair of electrodes 14 and 16, applied in a suitable manner, on two opposed surfaced thereof. Conductively attached to the electrodes 14 and 16, as by solder 18, are respective wire leads 20 and 22 operative to connect the transducer in the electrical or electronic circuit, not shown, in which it is to be employed. As well known in the art, an electromechanical transducer operates to convert applied electrical energy to mechanical energy, and vice versa. Therefore, if the ceramic body is subjected to mechanical stresses, the resulting strain generates an electrical output appearing as a voltage across the leads 20, 22. Conversely, a voltage applied across the leads produces a strain or mechanical deformation of ceramic body 12. It is to be understood that the term electromechanical transducer as used herein is taken in its broadest sense and includes piezoelectric filters, frequency control devices, and the like, and that the invention may also be used and adapted to various other applications requiring materials having dielectric, piezoelectric and/or electrostrictive properties.

For sake of clarity and ease of description, the constituents of compositions according to the invention may be categorized as "principal" and "secondary," the former term applying to those making up a major fraction of the whole composition and the latter making up a minor fraction. The principal ingredients, then, are lead titanate and either or both lead zirconate and lead stannate. The secondary ingredients comprise (1) from 1 to 25 atom percent of barium substituted for an equivalent quantity of the lead in the principal ingredients and (2) certain optional additions and substitutions which are described hereinbelow. For ease of description, the principal ingredients will be considered as basic compositions to which the secondary ingredients are added as direct additions or as substituents. It will be understood, however, that compositions according to the present invention may be formulated from various starting materials and intermediates.

From the foregoing, it will be appreciated that the basic compositions fall into three categories: (1) those belonging to the binary system lead zirconate-lead titanate; (2) those belonging to the binary system lead stannate-lead titanate; and (3) those belonging to the ternary system lead zirconate-lead stannate-lead titanate. The designations binary and ternary are used in conjunction with the basic compositions and in disregard of the secondary ingredients.

Furthermore, as will be appreciated by those conversant with the art, hafnium occurs as an impurity in varying amounts in zirconium; for the purposes of the invention, hafnium may be regarded as the substantial equivalent of zirconium and the presence of hafnium either as an impurity or as a substituent for zirconium is acceptable. However, because the high relative cost of hafnium as compared to zirconium renders its use uneconomic in commercial manufacture of the compositions under discussion, the present description will disregard the possible presence of hafnium. It will also be appreciated that various rare earth elements because of scarcity and relatively high cost, would not be economically competitive with others though fully operative from the technical standpoint.

Figure 3:
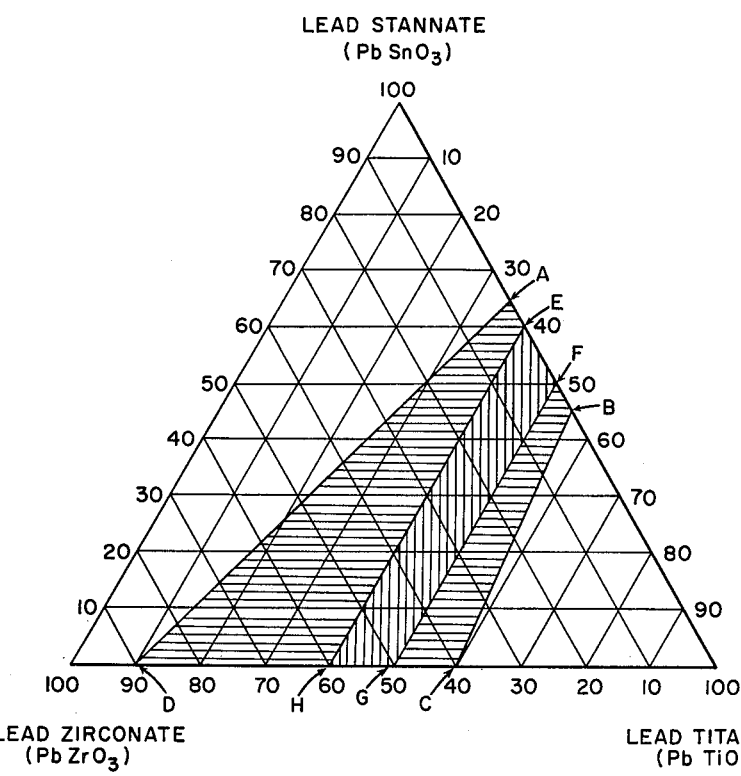
FIGURE 3 is a triangular compositional diagram of materials utilized in the present invention.

All possible basic compositions coming within all three of the systems defined above are represented by the triangular diagram constituting FIGURE 3 of the drawings. All compositions represented by the diagram as a whole, however, are not ferroelectric, and many are electromechanically active only to a very slight degree. The basic compositions utilized in the present invention are those exhibiting piezoelectric response of appreciable magnitude. As a matter of convenience, the planar coupling, $k_p$ (also known as radial coupling, $k_r$ and disk coupling $k_{disk}$) of polarized test disks will be taken as a measure of piezoelectric activity. Thus, within the horizontally hatched area bounded by lines connecting points ABCD, FIGURE 3, all basic compositions polarized and tested showed a radial coupling coefficient of at least 0.10. The area bounded by ABCD includes binary lead zirconate-lead titanate solid solutions lying on the line DC along which the mol ratio ($PbZrO_3:PbTiO_3$) of the end components varies from 90:10 to 40:60. Among these base line compositions those falling between points H and G have characteristically higher radial couplings with the highest couplings occurring where the

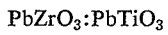

mol ratio is around 53:47 or 54:46.

The binary basic compositions on line AB

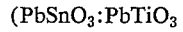

from 65:35 to 45:55) of the FIGURE 3 diagram are similar to those on line DC in structure but are characterized by generally lower radial couplings with the best couplings occurring in compositions falling between points E and F, i.e., with the mol ratio $PbSnO_3:PbTiO_3$ in the range 60:40 to 50:50.

In the ternary basic compositions within the area designated ABCD, the inclusion of $PbSnO_3$ as a substituent for a portion of the $PbZrO_3$ in the base line compositions has the effect of progressively lowering the Curie temperature but the compositions retain a relatively high radial coupling, particularly in the area of the diagram bounded by lines connecting points EFGH.

As previously mentioned, the basic compositions described above are modified in accordance with the present invention by the substitution of barium for 1 to 25 percent of the lead on an atom basis. The preferred range of barium substitution is 5 to 20 atom percent.

The general empirical formula for these basic compositions may be expressed

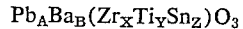

wherein A, B, X, Y and Z (subscripts) represent the mol fraction of atom percent of the respective component symbols with which each is associated and have the numerical values:

$A = 0.99$ to $0.75$;
$B = 0.01$ to $0.25$;
$X = 0$ to $0.90$;
$Y = 0.10$ to $0.60$;
$Z = 0$ to $0.65$; and
$A + B = X + Y + Z = 1.00$.

It was mentioned earlier that the present invention contemplates compositions containing secondary ingredients in addition to barium. Thus, part of the barium may be replaced by strontium and/or calcium. The effect of strontium and/or calcium on one hand and barium on the other is, in a general way, similar, i.e., all tend to increase permittivity. However, larger amounts of barium can be substituted for lead without untoward detriment to electromechanical coupling; moreover, barium causes less of a decrease in the Curie temperature.

Details, examples, and physical and electrical properties concerning the use of strontium and calcium in the basic compositions may be had by reference to U.S. Letters Patent No. 2,906,710, issued to F. Kulcsar and C. G.

Cmolik, and assigned to the same assignee as the present invention.

The novel ferroelectric ceramic compositions described above are further improved by addition of small quantities of other optional secondary ingredients. Thus, for improved stability and higher resistivity up to 5.0 weight percent, in the aggregate, of at least one member of the group consisting of niobium, tantalum and the rare earth elements (except cerium) all in oxidic form. Detailed information as to the use and effect of Nb, Ta and rare earth additions may be had by reference to U.S. Letters Patent No. 2,911,370, issued to F. Kulcsar, and assigned to the same assignee as the present invention.

Another group of optional secondary ingredients are the elements chromium and uranium which markedly improve the time and/or temperature stability of the basic composition. These elements are added in oxidic form in an aggregate quantity corresponding on a mol basis to 1.5 weight percent of chromium oxide ($Cr_2O_3$). Additional details as to this modification of the basic compositions may be had by reference to U.S. Letters Patent No. 3,006,857 to F. Kulcsar.

The compositions proposed may be prepared in accordance with various ceramic procedures, which, in themselves are well known in the art. The preferred method of preparing the basic compositions involves the use of lead oxide (PbO), zirconia ($ZrO_2$) and titania ($TiO_2$), all of relatively pure grade (e.g., C.P. grade), combined in proper proportions. (In some cases a small excess of lead oxide may be employed to balance the additions.) The barium (and, if used, the strontium and/or calcium) is added in the form of a reasonably reactive compound. The carbonates of these alkaline earth elements are preferred because of their ready commercial availability at relatively low cost and in suitable purity. In the reacting of the mixtures the carbonates evolve $CO_2$ and reduce to the respective oxides. The optional additions of niobium, tantalum and/or rare earth elements, conveniently in the form of their respective oxides, may also be incorporated into the mix at this time. The combined ingredients are then wet or dry milled to achieve thorough mixing and particle size reduction.

After milling, the mixture, either loose or suitably formed into desired shapes is pre-reacted by heating at a temperature of around 1050° C. for approximately 2 hours. The specific conditions of reaction will, of course, depend on such variable factors as the size and shape of the batch, and may be selected in accordance with established ceramic techniques to suit the particular case, the object being to approach, as closely as possible, a complete reaction of the mixture with evolution of unwanted gaseous reaction products, particularly carbon dioxide if barium carbonate is used as a source of barium.

Following the pre-sintering, the reacted material is allowed to cool and is then crushed and milled to a small particle size. When milling is completed, the presintered mixture is ready for forming into the desired shapes and firing to maturity. Depending on preference and the shapes desired, the material may be formed into a mix or slip suitable for pressing, slip casting, or extruding, as the case may be, in accordance with conventional ceramic procedures.

The samples for which data are given hereinbelow were prepared by admixing a commercial binder with the reacted powder and pressing it into disks, roughly 1-inch in diameter and 2 to 3 mm. thick, which were fired to maturity at a temperature around 1280° C. for about 45 minutes. Suitable precautions should preferably be taken to avoid or control loss of lead components through volatilization, such as by carrying out the firing in an enclosure containing a source of lead oxide vapor as explained in the aforementioned U.S. Patent Number 2,708,244.

Additional details of the procedures for compounding and firing the ceramic materials may be had by reference to the aforementioned U.S. Letters Patent 2,906,710 and 2,911,370.

The fired shapes may then be polarized in a manner well known in the art, for example, by applying a pair of electrodes (e.g., 14, 16, FIGURES 1 and 2) to opposite faces of the ceramic bodies and applying an electrostatic field to the electrodes. While the particular conditions of polarization may be varied as desired, D.C. field strengths of 150 to 175 volts per mil, at room temperature, sustained for one hour have given satisfactory results. Another method of polarizing, utilized to pole the ceramic bodies on which data are hereinafter presented, is disclosed in U.S. Letters Patent No. 2,928,163, issued to D. A. Berlincourt et al., and assigned to the same assignee as the present invention. Examples of specific ceramic compositions according to this invention and various pertinent electrical and electromechanical properties thereof are given in the following table in which the various constants and coefficients are defined as follows:

K: relative dielectric constant; permittivity of the material relative to permittivity of space.

$k_p$: planar piezoelectric coupling factor.

Percent D: Dissipation-dielectric loss or power factor measured at 1 kc.

| Group number | Example number | Intended composition | Relative dielectric Constant, K, 24 hours after poling | Planar coupling factor, $k_p$ | Electrical dissipation percent D |
|---|---|---|---|---|---|
| 0 | 0 | $Pb(Zr_{.53}Ti_{.47})O_3$ | 475–600 | .450–.500 | 0.39–1.26 |
| 0 | 00 | $Pb(Zr_{.54}Ti_{.46})O_3$ | 475–600 | .450–.500 | 0.39–1.26 |
| I | 1 | $Pb_{.95}Ba_{.05}(Zr_{.53}Ti_{.47})O_3$ | 751 | .540 | 0.47 |
|  | 2 | $Pb_{.90}Ba_{.10}(Zr_{.53}Ti_{.47})O_3$ | 864 | .548 | 0.51 |
|  | 3 | $Pb_{.80}Ba_{.20}(Zr_{.53}Ti_{.47})O_3$ | 2,018 | .530 | 0.54 |
| II | 4 | $Pb_{.90}Ba_{.10}(Zr_{.50}Ti_{.50})O_3$ | 1,012 | .441 | 0.37 |
|  | 5 | $Pb_{.90}Ba_{.10}(Zr_{.52}Ti_{.48})O_3$ | 1,216 | .522 | 0.50 |
|  | 6 | $Pb_{.90}Ba_{.10}(Zr_{.525}Ti_{.475})O_3$ | 1,275 | .510 | 0.55 |
|  | *2 | $Pb_{.90}Ba_{.10}(Zr_{.53}Ti_{.47})O_3$ | 864 | .548 | 0.51 |
|  | 7 | $Pb_{.90}Ba_{.10}(Zr_{.54}Ti_{.46})O_3$ | 694 | .527 | 0.63 |
|  | 8 | $Pb_{.90}Ba_{.10}(Zr_{.55}Ti_{.45})O_3$ | 714 | .516 | 0.78 |
| III | 9 | $Pb_{.80}Ba_{.20}(Zr_{.51}Ti_{.49})O_3$ | 1,623 | .530 | 0.45 |
|  | 10 | $Pb_{.80}Ba_{.20}(Zr_{.52}Ti_{.48})O_3$ | 1,551 | .491 | 0.48 |
|  | *3 | $Pb_{.80}Ba_{.20}(Zr_{.53}Ti_{.47})O_3$ | 2,018 | .530 | 0.54 |
|  | 11 | $Pb_{.80}Ba_{.20}(Zr_{.55}Ti_{.45})O_3$ | 1,617 | .582 | 0.67 |
| IV | 12 | $Pb_{.90}Ba_{.10}(Zr_{.51}Ti_{.49})O_3+1.39$ wt. percent $Ta_2O_5$ | 1,423 | .480 | 1.56 |
|  | 13 | $Pb_{.90}Ba_{.10}(Zr_{.52}Ti_{.48})O_3+1.39$ wt. percent $Ta_2O_5$ | 1,638 | .489 | 1.54 |
|  | 14 | $Pb_{.90}Ba_{.10}(Zr_{.53}Ti_{.47})O_3+1.39$ wt. percent $Ta_2O_5$ | 1,800 | .538 | 1.71 |
|  | 15 | $Pb_{.90}Ba_{.10}(Zr_{.55}Ti_{.45})O_3+1.39$ wt. percent $Ta_2O_5$ | 1,285 | .574 | 2.14 |
| V | 16 | $Pb_{.90}Ba_{.10}(Zr_{.52}Ti_{.48})O_3+1.03$ wt. percent $La_2O_3$ | 1,629 | .504 | 1.54 |
|  | 17 | $Pb_{.90}Ba_{.10}(Zr_{.53}Ti_{.47})O_3+1.03$ wt percent $La_2O_3$ | 1,825 | .531 | 1.67 |
|  | 18 | $Pb_{.90}Ba_{.10}(Zr_{.54}Ti_{.46})O_3+1.03$ wt. percent $La_2O_3$ | 2,477 | .604 | 2.24 |
|  | 19 | $Pb_{.90}Ba_{.10}(Zr_{.55}Ti_{.45})O_3+1.03$ wt. percent $La_2O_3$ | 2,017 | .610 | 2.46 |
| VI | 20 | $Pb_{.90}Ba_{.05}Sr_{.05}(Zr_{.53}Ti_{.47})O_3$ | 1,229 | .548 | 0.42 |

*Repeated to facilitate comparison.

Referring now to the table of exemplary compositions, it will be noted that Examples Nos. 0 and 00 are plain lead zirconate titanate ceramics of slightly different mol ratios. These conventional compositions are included in the table to serve as a datum or basis for comparison and these particular mol ratios were selected because they exhibit the highest electromechanical coupling coefficient ($k_p$) and dielectric constants (K). It will be noted therefore, that the best unmodified lead zirconate titanate compositions exhibit a dielectric constant of 475 to 600. On the other hand, the compositions embraced by the present invention all are characterized by a significantly higher dielectric constant. Referring in this connection to the examples given in the table, the composition having the lowest dielectric constant is No. 1 for which $K=751$ and is about a 25% improvement over the upper limit of the range for the best unmodified lead zirconate titanate compositions. The increase in dielectric constant ranges up to more than 300% for composition No. 18 ($K=2477$). By comparing the planar coupling coefficients of the tabulated compositions it will be appreciated that the improvement in dielectric constant is accomplished without sacrifice in coupling and in most cases is accompanied by a marked increase in coupling factor, $k_p$. For example, compositions Nos. 4, 10, 12 and 13 have coupling coefficients in the same range as unmodified lead titanate-lead zirconate in mol ratios of 53:47 and 54:46 but most of the compositions are marked by improvement in coupling factor ranging up to about 20%.

The electrical dissipation, an important consideration in dielectric materials, is quite low (less than 3%), for compositions according to the invention.

The examples presented in the table have been selected to represent a broad cross-section of those falling within the scope of the disclosure and to show the effect of varying different compositional parameters. To facilitate comparison, the examples are arranged in groups and some are duplicated in two groups. Group I (Examples Nos. 1 through 3) shows the effect of varying the amount of barium for a fixed $PbZrO_3:PbTiO_3$ mol ratio, viz., 53:47. It will be noted that increasing amounts of barium do not materially alter the coupling factor but progressively increase the dielectric constant.

Groups II and III demonstrate the effect of varying the $PbZrO_3:PbTiO_3$ mol ratio with fixed amounts of 10 and 20 atom percent, respectively, of barium. With 10 atom percent barium, the dielectric constant peaks at a mol ratio of about 0.525:0.475 indicating the presence of a morphotropic phase boundary. The permittivity is generally higher on the low zirconate side of the boundary where the compositions are characterized by tetragonal symmetry. On the opposite side of the phase boundary, the compositions are of rhombohedral symmetry.

With 20 atom percent barium (Group III), the general level of both dielectric constant and coupling factor is higher than with 10 atom percent.

Referring to Groups IV and V, penta- and tri-valent additives, as described in the aforementioned U.S. Letters Patent No. 2,911,370 used in conjunction with barium, have the effect of further raising the general level of permittivity and coupling, yielding the preferred compositions, viz., those constituting Examples 14-19.

Example composition No. 20 is included in the tabulation to demonstrate the substitution of strontium in place of one-half of the barium. While this composition does not possess as high a dielectric constant as that with the same $PbZrO_3:PbTiO_3$ mol ratio and 10 atom percent barium (No. 14), it has about the same coupling and is entirely satisfactory for use as a transducer material.

In addition to the advantageous properties outlined above, compositions according to the present invention yield ceramics of good physical quality and which polarize well.

While there have been described what at present are considered to be the preferred embodiments of the invention, it will be obvious to those skilled in the art that various changes and modifications can be made therein without departing from the invention, and it is aimed, therefore, in the appended claims to cover all such changes and modifications as fall within the true spirit and scope of the invention.

This application is a continuation-in-part of our copending application, Serial No. 842,266, filed September 25, 1959, now abandoned.

What is claimed and desired to be secured by United States Letters Patent is:

1. As a composition of matter, a ceramic solid solution consisting essentially of a material selected from the area ABCD of FIGURE 3 and containing barium substituted for from 1 to 25 atom percent of the lead in said material.

2. As a composition of matter, a ceramic solid solution consisting essentially of a material selected from the area ABCD of FIGURE 3, containing barium as a partial substituent for at least one atom percent of the lead and additionally containing at least one alkaline earth element selected from the group which consists of calcium and strontium as a partial substituent for at least one atom percent of the lead, the total quantity of barium, calcium and strontium in said solid solution being not greater than 25 atom percent of the lead in said material.

3. As a composition of matter, a ceramic solid solution consisting essentially of a material selected from the area EFGH of FIGURE 3 and containing barium as a partial substituent for from 1 to 25 atom percent of the lead in said material.

4. A composition of matter as defined in claim 3 wherein said ceramic solid solution contains from 0.1 to 5.0 weight percent on an oxide basis, of at least one element selected from the group consisting of tantalum, niobium and the rare earth elements, including yttrium but excluding cerium.

5. A composition of matter as defined in claim 3 wherein said ceramic solid solution contains a quantity corresponding on a mol basis of from 0.1 to 1.5 weight percent of $Cr_2O_3$, of at least one element selected from the group consisting of chromium and uranium.

6. As a composition of matter, a ceramic solid solution consisting essentially of a material selected from the area EFGH of FIGURE 3, containing barium as a partial substituent for at least one atom percent of the lead and additionally containing at least one alkaline earth element selected from the group which consists of calcium and strontium as a partial substituent for at least one atom percent of the lead, the total quantity of barium, calcium and strontium in said solid solution being not greater than 25 atom percent of the lead in said material.

7. A novel composition of matter consisting essentially of electromechanically sensitive lead zirconate titanate having a lead zirconate to lead titanate mol ratio of about 60:40 to 40:60 and containing, as a substituent for lead, 1 to 25 atom percent of barium.

8. A composition of matter consisting essentially of electromechanically sensitive lead zirconate titanate having a lead zirconate to lead titanate mol ratio of about 60:40 to 40:60 and containing, as a substitutent for lead, about 5 to about 25 atom percent of barium.

9. A composition of matter consisting essentially of electromechanically sensitive lead zirconate titanate having a lead zirconate to lead titanate mol ratio of about 60:40 to 50:50 and containing, as a substituent for lead, approximately 10 atom percent of barium.

10. A composition of matter consisting essentially of electromechanically sensitive lead zirconate titanate having a lead zirconate to lead titanate mol ratio of about 60:40 to 50:50 and containing, as a substitutent for lead, approximately 5 atom percent of barium.

11. A novel composition of matter having essentially the constituency indicated by the formula $$Pb_{.88}Ba_{.10}La_{.02}(Zr_{.54}Ti_{.46})O_3$$

12. A novel composition of matter having essentially the constituency indicated by the formula $$Pb_{.88}Ba_{.10}La_{.02}(Zr_{.55}Ti_{.45})O_3$$

13. A novel composition of matter having essentially the constituency indicated by the formula $$Pb_{.80}Ba_{.20}(Zr_{.55}Ti_{.45})O_3$$

14. An electrically polarized body consisting essentially of a ceramic solid solution of a material selected from the area EFGH of FIGURE 3 and containing, as a substituent for lead, from 1 to 25 atom percent of barium, said body having a planar coupling factor substantially higher than 0.400 and having a relative dielectric constant higher than about 700.

15. An electromechanical transducer comprising:
a pair of spaced electrodes;
and, interposed between said electrodes, an electrically polarized body consisting essentially of a ceramic solid solution of electromechanically sensitive lead zirconate titanate having a lead zirconate to lead titanate mol ratio of about 60:40 to 50:50 and containing, as a substituent for lead, from 1 to 25 atom percent of barium, said body having a planar coupling factor substantially higher than 0.400 and having a relative dielectric constant higher than about 700.

16. The transducer of claim 15 wherein said body has a planar coupling factor higher than 0.500 and has an electrical dissipation of less than 3%, measured at 1 kc.

References Cited in the file of this patent

UNITED STATES PATENTS

| | | |
|---|---|---|
| 2,906,710 | Kulcsar | Sept. 29, 1959 |
| 2,906,973 | Mason | Sept. 29, 1959 |
| 2,911,370 | Kulcsar | Nov. 3, 1959 |
| 2,960,411 | Brajer et al. | Nov. 15, 1960 |
| 3,006,857 | Kulcsar | Oct. 31, 1961 |
| 3,068,177 | Sugden | Dec. 11, 1962 |